US012693734B2

(12) United States Patent
Nishio et al.

(10) Patent No.: US 12,693,734 B2
(45) Date of Patent: Jul. 28, 2026

(54) INFORMATION PROCESSING APPARATUS AND CONTROL METHOD

(71) Applicant: Lenovo (Singapore) Pte. Ltd., Singapore (SG)

(72) Inventors: Masashi Nishio, Kanagawa (JP); Yuji Wada, Kanagawa (JP); Liheng Mo, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 19/030,096

(22) Filed: Jan. 17, 2025

(65) Prior Publication Data

US 2025/0271926 A1 Aug. 28, 2025

(30) Foreign Application Priority Data

Feb. 28, 2024 (JP) ................................. 2024-028554

(51) Int. Cl.
 G06F 3/01 (2006.01)
 G01S 17/08 (2006.01)
 G09G 3/20 (2006.01)
(52) U.S. Cl.
 CPC .............. G06F 3/012 (2013.01); G01S 17/08 (2013.01); G09G 3/20 (2013.01); G09G 2320/0626 (2013.01); G09G 2354/00 (2013.01)
(58) Field of Classification Search
 None
 See application file for complete search history.

(56) References Cited

U.S. PATENT DOCUMENTS 10,834,461 B1 * 11/2020 Kosugi .............. H04N 21/6587
11,093,030 B2 * 8/2021 Akahori ................. G06V 40/18
(Continued)

FOREIGN PATENT DOCUMENTS

CN      117472316 B    5/2024
JP      2010-205269 A   9/2010
(Continued)

OTHER PUBLICATIONS

Extended European Search Report issued in corresponding European Patent Application No. 25150372.8, dated Apr. 29, 2025 (10 pages).

*Primary Examiner* — Benyam Ketema
(74) *Attorney, Agent, or Firm* — Osha Bergman Watanabe & Burton LLP

(57) ABSTRACT

An information processing apparatus includes: a distance measuring sensor which measures a distance to an object; a memory which temporarily stores distance information indicative of the distance measured by the distance measuring sensor; and a processor which executes processing based on the distance information. The processor performs person detection processing to detect a person present within a first distance range using the distance measuring sensor, and face direction determination processing to determine a face orientation of the person when the person is detected within the first distance range by the person detection processing. In the face direction determination processing, when the person detected by the person detection processing is within a second distance range closer than the first distance range, the processor determines a face orientation of the person using the distance measuring sensor.

8 Claims, 7 Drawing Sheets

(56)          References Cited

U.S. PATENT DOCUMENTS

| | | | | |
|---|---|---|---|---|
| 12,288,496 | B2 * | 4/2025 | Nishio | G09G 5/10 |
| 12,417,271 | B2 * | 9/2025 | Kosugi | G06V 10/60 |
| 2009/0226095 | A1 * | 9/2009 | Usui | G06V 40/161 |
| | | | | 382/295 |
| 2010/0079371 | A1 * | 4/2010 | Kawakami | G06F 3/0485 |
| | | | | 345/156 |
| 2012/0075166 | A1 * | 3/2012 | Marti | G02B 27/0093 |
| | | | | 345/1.1 |
| 2012/0096481 | A1 * | 4/2012 | Sano | G06F 3/167 |
| | | | | 725/12 |
| 2014/0337654 | A1 * | 11/2014 | Chen | G06F 1/3231 |
| | | | | 713/323 |
| 2015/0124084 | A1 * | 5/2015 | Ikenoue | A63F 13/213 |
| | | | | 348/135 |
| 2016/0371535 | A1 * | 12/2016 | Li | G06V 40/172 |
| 2018/0165437 | A1 * | 6/2018 | Shim | H04M 1/724631 |
| 2020/0210206 | A1 * | 7/2020 | Kosugi | G06F 9/44505 |
| 2020/0336788 | A1 * | 10/2020 | Kosugi | H04H 60/33 |
| 2020/0356160 | A1 * | 11/2020 | Kosugi | G06F 1/3231 |
| 2020/0363857 | A1 * | 11/2020 | Kosugi | G06F 1/324 |
| 2021/0096632 | A1 * | 4/2021 | Kosugi | G06F 1/3215 |
| 2021/0132769 | A1 * | 5/2021 | Parikh | G06N 3/09 |
| 2021/0149441 | A1 * | 5/2021 | Bartscherer | G06F 1/1616 |
| 2022/0067346 | A1 * | 3/2022 | Yang | G06V 40/166 |
| 2022/0122125 | A1 * | 4/2022 | Uchimura | G06Q 30/02 |
| 2022/0366722 | A1 * | 11/2022 | Kosugi | G06V 40/161 |
| 2022/0382359 | A1 * | 12/2022 | Kosugi | G06F 1/3265 |
| 2023/0012914 | A1 * | 1/2023 | Utsumi | G06T 7/73 |
| 2024/0184347 | A1 * | 6/2024 | Nishio | G06V 40/161 |
| 2024/0249689 | A1 * | 7/2024 | Kosugi | G09G 3/3406 |
| 2024/0273942 | A1 * | 8/2024 | Nishio | G06F 1/1681 |
| 2024/0296814 | A1 * | 9/2024 | Nishio | G06F 3/012 |
| 2024/0321163 | A1 * | 9/2024 | Nishio | G06V 40/161 |
| 2024/0321236 | A1 * | 9/2024 | Nishio | G06T 7/70 |
| 2024/0355308 | A1 * | 10/2024 | Nishio | G06V 40/161 |
| 2025/0130631 | A1 * | 4/2025 | Sivagnanenthirarajah | |
| | | | | G06F 21/84 |

FOREIGN PATENT DOCUMENTS

| | | |
|---|---|---|
| JP | 2019-179386 A | 10/2019 |
| JP | 2020-102151 A | 7/2020 |
| WO | 2020/189196 A1 | 9/2020 |

* cited by examiner

INFORMATION PROCESSING APPARATUS AND CONTROL METHOD

CROSS-REFERENCE TO RELATED APPLICATIONS

This application claims priority to Japanese Patent Application No. 2024-028554 filed on Feb. 28, 2024, the contents of which are hereby incorporated herein by reference in their entirety.

TECHNICAL FIELD

The present invention relates to an information processing apparatus and a control method.

BACKGROUND

There is a device that automatically boots the system when detecting the approach of a person by a distance sensor (distance measuring sensor) for detecting a distance using infrared light (for example, Japanese Unexamined Patent Application Publication No. 2020-102151).

Further, in recent years, with the development of computer vision and the like, detection accuracy when detecting a face from a captured image captured by a camera has been getting higher, and person detection by face detection has also been performed. In the person detection by face detection, since the orientation of a face can also be detected in addition to simply detecting a person, control according to the orientation of the face (facing forward, facing sideways, or the like) can also be performed. For example, when the face is turned to the side, the screen brightness is controlled to be reduced or turned off in order to prevent power from being wastefully consumed during a period when a user is not using the device.

However, in the determination of the orientation of the face by face detection described above, the load of development related to image recognition and the like for face detection is high, and power consumption is also high because it is necessary to capture images using a camera. Therefore, a method of reducing power consumption by determining the orientation of the face of a person in a simple way using a distance measuring sensor is considered. For example, in order to determine the orientation of the face using the distance measuring sensor, it is possible to make the determination using a difference between a distance measurement value in a top part of the face and a distance measurement value in a bottom part of the face, using a difference between a distance measurement value in a left part of the face and a distance measurement value in a right part of the face, and the like. However, since it is necessary to determine slight differences among distance measurement values due to changes in face orientation, the differences are buried in errors during distance measurement at a long distance, and hence a determinable range is limited to a short distance. Therefore, the orientation of the face of the person is determined using the distance measuring sensor in a short distance range within a person detectable range, while when exceeding a distance range in which the orientation of the face is determinable by the distance measuring sensor, measures are taken such as to fix the determination by assuming that the face is facing forward.

The orientation of the face is determined using the distance measuring sensor within the distance range in which the orientation of the face is determinable. On the other hand, when such a measure that the determination is fixed by assuming that the face is facing forward in the case of exceeding the distance range in which the orientation of the face is determinable, the determination result changes unstably near the boundary of the determinable distance range, and there is a concern that the screen brightness may also become unstable if the screen brightness is controlled based on this determination result.

SUMMARY

One or more embodiments of the present invention provide an information processing apparatus and a control method for improving control stability using a distance measuring sensor.

An information processing apparatus according to one or more embodiments of the present invention includes: a distance measuring sensor which measures a distance to an object; a memory which temporarily stores distance information indicative of the distance measured by the distance measuring sensor; and a processor which executes processing based on the distance information, the processor performing person detection processing to detect a person present within a first distance range using the distance measuring sensor, and face direction determination processing to determine a face orientation of the person when the person is detected within the first distance range by the person detection processing, wherein in the face direction determination processing, when the person detected by the person detection processing is within a second distance range closer than the first distance range, the processor determines a face orientation of the person using the distance measuring sensor, when the person detected by the person detection processing moves from within the second distance range into a range out of the second distance range, the processor maintains the determination result of the face orientation determined within the second distance range, and when a person is detected in the range out of the second distance range within the first distance range from a state where no person is detected within the first distance range by the person detection processing, the processor fixes the determination result to a preset face orientation.

The above information processing apparatus may be such that, in the face direction determination processing, after maintaining the determination result of the face orientation determined within the second distance range due to the fact that the person detected by the person detection processing moves from within the second distance range into the range out of the second distance range, when the person detected by the person detection processing moves into the second distance range again, the processor cancels the maintenance of the determination result and determines a face orientation of the person using the distance measuring sensor.

The above information processing apparatus may also be such that, in the face direction determination processing, after maintaining the determination result of the face orientation determined within the second distance range due to the fact that the person detected by the person detection processing moves from within the second distance range into the range out of the second distance range, when the person is no longer detected within the first distance range by the person detection processing, the processor cancels the maintenance of the determination result and ends the face direction determination processing.

The above information processing apparatus may further be such that, in the face direction determination processing, after fixing the determination result of the face orientation due to the fact that the person is detected in the range out of the second distance range within the first distance range from the state where no person is detected within the first distance range by the person detection processing, when the person detected by the person detection processing moves into the second distance range from the range out of the second distance range, the processor cancels the fixation of the determination result and determines a face orientation of the person using the distance measuring sensor.

Further, the above information processing apparatus may be such that, in the face direction determination processing, after fixing the determination result of the face orientation due to the fact that the person is detected in the range out of the second distance range within the first distance range from the state where no person is detected within the first distance range by the person detection processing, when the person is no longer detected within the first distance range by the person detection processing, the processor cancels the fixation of the determination result and ends the face direction determination processing.

Further, the above information processing apparatus may be such that, in the face direction determination processing, the processor determines whether or not the face orientation of the person detected within the first distance range by the person detection processing is facing a direction of the information processing apparatus, and when fixing the determination result to the preset face orientation, the processor fixes the determination result to such a determination result that the face orientation of the person is facing the direction of the information processing apparatus.

Further, the above information processing apparatus may be such that the processor performs screen brightness control processing to control the screen brightness of a display unit based on the face orientation determined by the face direction determination processing.

Further, a control method according to one or more embodiments of the present invention is a control method for an information processing apparatus including: a distance measuring sensor which measures a distance to an object; a memory which temporarily stores distance information indicative of the distance measured by the distance measuring sensor; and a processor which executes processing based on the distance information, the control method including: a person detection step of causing the processor to detect a person present within a first distance range using the distance measuring sensor; and a face direction determination step of causing the processor to determine a face orientation of the person when the person is detected within the first distance range by the person detection step, wherein in the face direction determination step, when the person detected by the person detection step is within a second distance range closer than the first distance range, the processor determines a face orientation of the person using the distance measuring sensor, when the person detected by the person detection step moves from within the second distance range into a range out of the second distance range, the processor maintains the determination result of the face orientation determined within the second distance range, and when a person is detected in the range out of the second distance range within the first distance range from a state where no person is detected within the first distance range by the person detection step, the processor fixes the determination result to a preset face orientation.

One or more embodiments of the present invention can improve control stability using a distance measuring sensor.

DETAILED DESCRIPTION

Embodiments of the present invention will be described below with reference to the accompanying drawings.

First, the overview of an information processing apparatus 1 according to one or more embodiments will be described.

Overview

Figure 1:
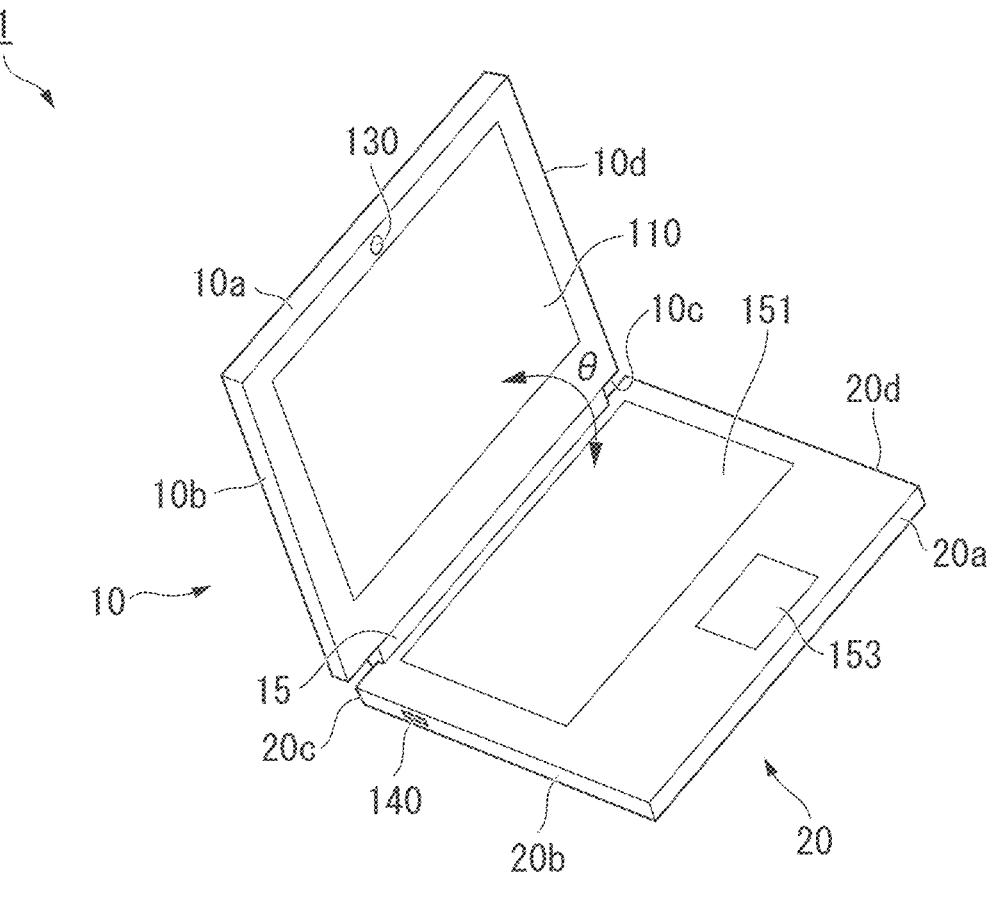
FIG. 1 is a perspective view illustrating a configuration example of the appearance of an information processing apparatus according to one or more embodiments.

FIG. 1 is a perspective view illustrating a configuration example of the appearance of the information processing apparatus 1 according to one or more embodiments. The information processing apparatus 1 is, for example, a laptop (clamshell) PC (Personal Computer).

The information processing apparatus 1 includes a first chassis 10, a second chassis 20, and a hinge mechanism 15. The first chassis 10 and the second chassis 20 are joined by using the hinge mechanism 15. The first chassis 10 is rotatable around an axis of rotation formed by the hinge mechanism 15 relative to the second chassis 20. An open angle by the rotation between the first chassis 10 and the second chassis 20 is denoted by "θ" in FIG. 1.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c toward the side face 20a is referred to as "front." Further, a direction to the right when looking at the information processing apparatus 1 from the front is referred to as "right side," and a direction to the left is referred to as "left side." Side faces on the right side of the first chassis 10 and the second chassis 20 are referred to as side faces 10b and 20b, respectively, and side faces on the left side are referred to as side faces 10d and 20d, respectively. Further, a state where the first chassis 10 and the second chassis 20 overlap each other and are completely closed (a state of open angle θ=0°) is referred to as a "closed state." Surfaces of the first chassis 10 and the second chassis 20 on the face-to-face sides in the closed state are referred to as respective "inner surfaces," and the surfaces opposite to the inner surfaces are referred to as "outer surfaces." Further, a state opposite to the closed state, where the first chassis 10 and the second chassis 20 are open, is referred to as an "open state."

The appearance of the information processing apparatus 1 in FIG. 1 illustrates an example of the open state. The open state is a state where the side face 10a of the first chassis 10 and the side face 20a of the second chassis 20 are separated. In the open state, the respective inner surfaces of the first chassis 10 and the second chassis 20 appear. The open state is one of states where a user uses the information processing apparatus 1, and the information processing apparatus 1 is often used in a state where the open angle is typically about θ=100° to 130°. Note that the range of open angles θ to be the open state can be set arbitrarily according to the range of angles rotatable by the hinge mechanism 15, or the like.

A display unit 110 is provided on the inner surface of the first chassis 10. The display unit 110 is configured to include a liquid crystal display (LCD) or an organic EL (Electro Luminescence) display, and the like. Further, a ToF sensor 130 is provided in a peripheral area of the display unit 110 on the inner surface of the first chassis 10. For example, the ToF sensor 130 is arranged on the side of the side face 10a in the peripheral area of the display unit 110. Note that the position at which the ToF sensor 130 is arranged is just an example, and it may be elsewhere as long as the ToF sensor 130 can face a direction facing a display screen of the display unit 110.

The ToF sensor 130 is a distance measuring sensor for measuring a distance to an object (for example, a person) present in the direction facing the display screen of the display unit 110 (that is, in front of the information processing apparatus 1). For example, The ToF sensor 130 is configured to include a light-emitting part for emitting infrared light and a light-receiving part for receiving reflected light which is the infrared light returned after emitted and reflected on the surface of the object. The ToF sensor 130 emits infrared light forward in a predetermined sampling cycle (for example, 1 Hz) and receives the reflected light of the emitted infrared light to output a distance measurement signal according to the distance to the object (for example, the person) using a ToF (Time-of-Flight) method for converting, into a distance, a time difference from light emission to light reception.

Further, a power button 140 is provided on the side face 20b of the second chassis 20. The power button 140 is an operating element used by the user to give an instruction to power on or power off, make a transition from a standby state to a normal operating state, make a transition from the normal operating state to the standby state, or the like. The normal operating state is an operating state of a system capable of executing processing without being particularly limited, which corresponds, for example, to S0 state defined in the ACPI (Advanced Configuration and Power Interface) specification.

The standby state is a state in which at least part of system processing is limited and power consumption is lower than that in the normal operating state. For example, the standby state may be the standby state or a sleep state, modern standby in Windows (registered trademark), or a state corresponding to S3 state (sleep state) defined in the ACPI specification. Further, a state in which at least the display of the display unit appears to be OFF (screen OFF), or a screen lock state may also be included as the standby state. The screen lock is a state in which an image preset to make a content being processed invisible (for example, an image for the screen lock) is displayed on the display unit, that is, an unusable state until the lock is released (for example, until the user is authenticated).

Further, a keyboard 151 and a touch pad 153 are provided on the inner surface of the second chassis 20 as an input device to accept user operation input. Note that a touch sensor may also be provided as the input device instead of or in addition to the keyboard 151 and the touch pad 153, or a mouse and an external keyboard may be connected. When the touch sensor is provided, an area corresponding to the display screen of the display unit 110 may be constructed as a touch panel to accept operations. Further, a microphone used to input voice may be included in the input device.

Note that, in the closed state where the first chassis 10 and the second chassis 20 are closed, the display unit 110 provided on the inner surface of the first chassis 10, and the keyboard 151 and the touch pad 153 provided on the inner surface of the second chassis 20 are covered with each other's chassis surfaces, and put in a state of being disabled from fulfilling the functions.

The information processing apparatus 1 executes HPD (Human Presence Detection) processing to detect a person present in front of the information processing apparatus 1 based on the distance measurement signal output by the ToF sensor 130.

Figure 2:
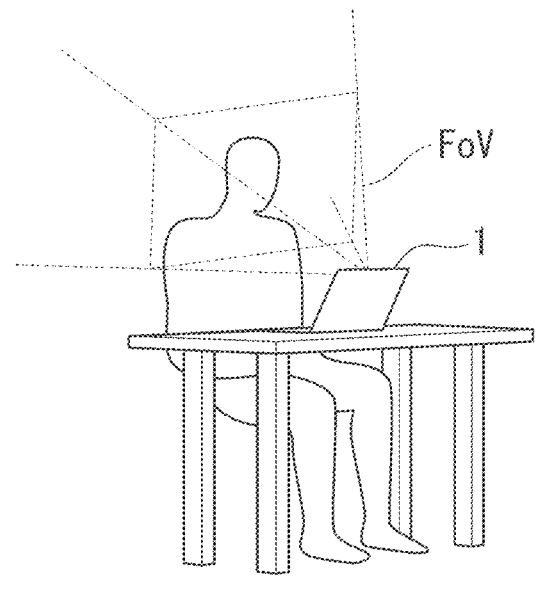
FIG. 2 is a diagram illustrating an example of a person detection range of the information processing apparatus according to one or more embodiments.

FIG. 2 is a diagram illustrating an example of a distance measuring range of the ToF sensor 130 according to one or more embodiments. In the open state, the ToF sensor 130 arranged on the inner surface of the first chassis 10 measures the distance to an object (for example, a person) in the direction (frontward) facing the inner surface of the first chassis 10. This ToF sensor 130 is a distance measuring sensor for detecting a person (for example, the user) present in front, and a detection range to detect the person is called a detection range FoV (Field of View: detection viewing angle). The detection range FoV corresponds to a range of angles in which the ToF sensor 130 can measure the distance.

For example, the ToF sensor 130 divides the detection range FoV into measurement units of 8×8 squares to measure a distance for each square (for each measurement unit). Note that, since the purpose is to detect a person (user) who uses the information processing apparatus 1, the distance to an object at a certain distance (for example, 2 m) or farther away may be excluded from a target to be measured. Note that it is impossible in the first place to measure the distance to an object far away by a distance at which the infrared light cannot reach.

The information processing apparatus 1 controls the operating state of the system of the information processing apparatus 1 depending on the presence or absence of a person by the HPD processing. For example, when a person approaches the information processing apparatus 1 (Approach) and the presence of the person is detected (Presence), the information processing apparatus 1 boots the system and controls the system to the normal operating state.

Further, when the person has left the information processing apparatus 1 (Leave) and the person is no longer detected in front, the information processing apparatus 1 controls the system to the standby state.

Further, when detecting that a person is present in front of the information processing apparatus 1, the information processing apparatus 1 detects a face orientation of the person based on a distance measurement signal output by the ToF sensor 130. For example, the information processing apparatus 1 determines whether or not the face of the person is facing the direction of the information processing apparatus 1 (the direction of the display unit 110). Here, it is assumed that a state where the face of the person is facing the direction of the information processing apparatus 1 (the direction of the display unit 110) (that is, a state where the face is facing forward toward the information processing apparatus 1) is a state where the person is paying attention to the information processing apparatus 1. On the other hand, it is assumed that a state where the face of the person is not facing the direction of the information processing apparatus 1 (the direction of the display unit 110) (a state where the face orientation toward the information processing apparatus 1 is leftward, rightward, upward, or downward, that is, the face is not facing forward toward the information processing apparatus 1) is a state where person is not paying attention to the information processing apparatus 1.

For example, the information processing apparatus 1 controls the screen brightness of the display unit 110 (dimming control) according to the determination result of the face orientation. Specifically, when the face orientation is turned to a state where the face is not facing forward (a state where the person is not paying attention to the information processing apparatus 1), the information processing apparatus 1 reduces the screen brightness of the display unit 110 to save power. Further, when the face orientation is turned to front facing again (when the person is paying attention to the information processing apparatus 1 again), the information processing apparatus 1 restores the screen brightness to an original screen brightness before being reduced.

In the following, the original screen brightness before being reduced is called "standard brightness." Further, the screen brightness reduced from the standard brightness when the face is not facing forward is called "low brightness." The low brightness is a brightness at least lower than the standard brightness, but as the brightness becomes lower, the effect of power saving increases. For example, the low brightness may be set to a brightness of about 0 to 10% of the standard brightness.

Face Orientation Determination Method

Next, a determination method of determining a face orientation based on a distance measurement signal output from the ToF sensor 130 will be described. In one or more embodiments, the information processing apparatus 1 determines a front, left, right, up, or down orientation as the face orientation. The left-and-right orientation is an orientation of the face in the horizontal direction corresponding to the direction of rotation with the vertical axis passing through the center of the face as the central axis. Further, the up-and-down orientation is an orientation of the face in the vertical direction corresponding to the direction of rotation with the horizontal axis passing through the center of the face as the central axis.

Figure 3:
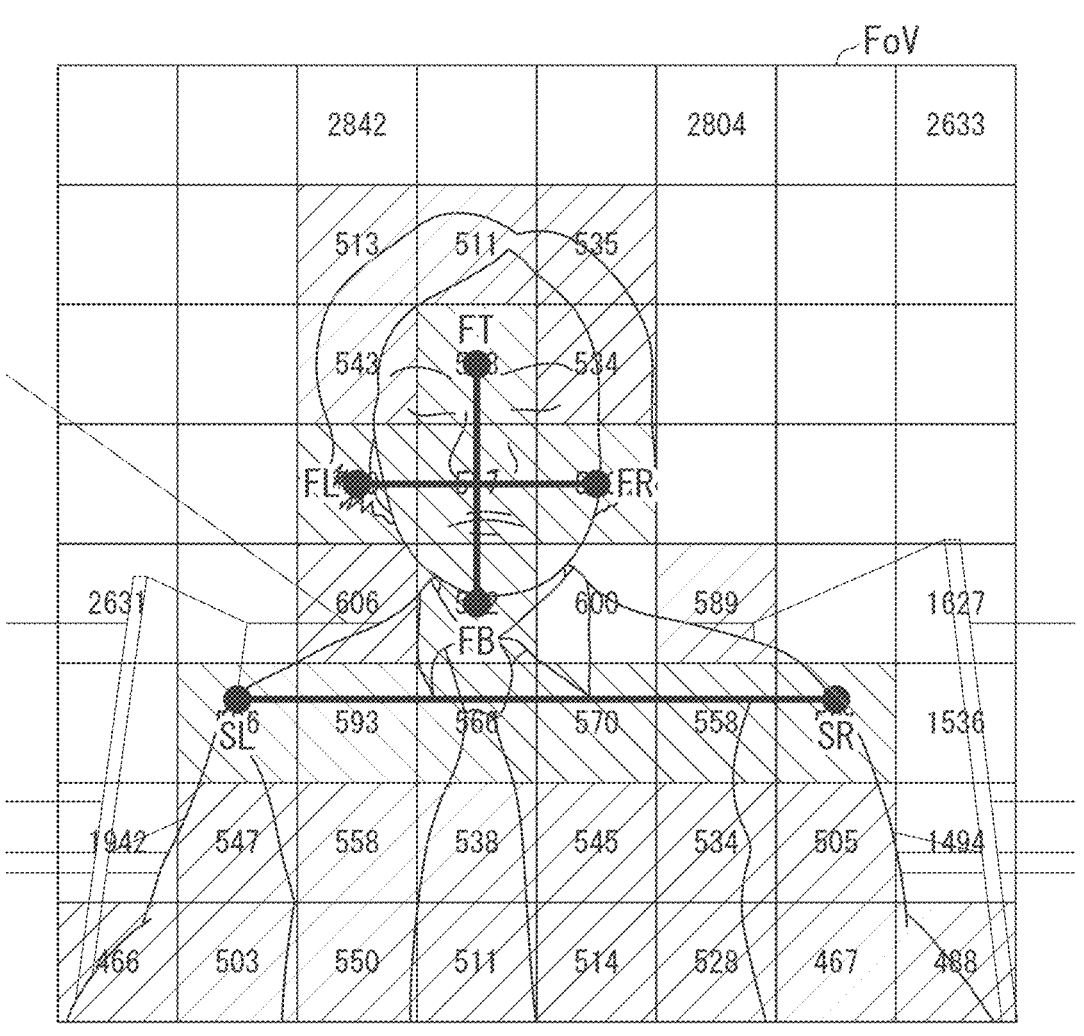
FIG. 3 is an explanatory diagram of a determination method of a face orientation according to one or more embodiments.

FIG. 3 is an explanatory diagram of the determination method of the face orientation according to one or more embodiments. In this figure, the detection range FoV is divided into 64-square measurement units of 8×8 squares, and an example of a distance measurement value for each square (each measurement unit) is numerically represented in each square. For example, the distance measurement value in each square is a distance measurement value measured by the ToF sensor 130 in a predetermined cycle (for example, at one second interval). Since any person moves to some extent, the distance measurement value in each square is constantly changing. Therefore, the distance measurement values measured in predetermined cycles (for example, at one second intervals) may be time-averaged to obtain a reliable distance measurement value.

In this figure, the unit of a distance measurement value numerically represented in each square is millimeters. In the illustrated example, a range of squares with distance measurement values of 450 to 610 is a range in which a person is present. Squares with distance measurement values of 1000 or more are distance measurement values of a ceiling and an object behind the person. Further, squares without any distance measurement value are squares that are impossible to measure distances because objects are too far away.

The range of the person is characterized in that the edge of the range generally has a mountain shape, and the width of a part above the shoulders of a body is shorter than the shoulder width. For example, when the edge of a range of squares, in which the distance measurement values are obtained within 1 m (1000 mm) with small differences thereamong (here, about 450 to 610), becomes a mountain shape having the characteristics of a person, the information processing apparatus 1 detects the range as a range of the person (that is, detects that the person is present). In the illustrated example, six squares lined up from a square marked with SL (Shoulder Left) to a square marked with SR (Shoulder Right) in the horizontal direction (the left and right direction) correspond to a shoulder range (shoulder width), and the width of the part above the shoulder range is shorter than the shoulder width.

Further, the information processing apparatus 1 detects, as a face range, a range above the shoulder range and narrower in left and right width than the shoulder range. For example, the information processing apparatus 1 detects, as a face range, 3 (horizontal)×4 (vertical) squares above the shoulder range within the person range. The size of this face range corresponds to a range of a face of the person present at a distance and using the information processing apparatus 1 (performing keyboard operations) when distances are measured by dividing the detection range FoV into 8×8 squares.

Note that the information processing apparatus 1 may also detect, as the face range, 3×3 squares above the shoulder range within the person range. Further, when distance measurements are made in measurement units of the detection range FoV other than 8×8 squares, the face range is also set to a range according to the number of measurement units instead of 3×4 squares or 3×3 squares.

Further, as illustrated, it is assumed that the center square in the face range is the center of the face, and a distance measurement value in a square marked with FT (Face Top) above the center square is a distance measurement value of a top part of the face (forehead position). It is also assumed that a distance measurement value in a square marked with FB (Face Bottom) below the center square is a distance measurement value of a bottom part of the face (chin position). It is further assumed that a distance measurement value in a square marked with FL (Face Left) on the left side of the center square is a distance measurement value of a left part of the face. Further, it is assumed that a distance measurement value in a square marked with FR (Face Right)

on the right side of the center square is a distance measurement value of a right part of the face.

Note that when the face range is composed of 3×3 squares, the center square in the face range is a center square of the 3×3 squares, while when the face range is composed of 3 (horizontal)×4 (vertical) squares, the center square is either a square in the second row and the center column or a square in the third row and the center column. Here, the lower square (the square in the third row) is prioritized as the center square.

Note that the upper square (the square in the second row) may also be prioritized as the center square. Further, the distance measurement values in both of the squares may be tracked to prioritize, as the center square, a square smaller in distance measurement value, or prioritize, as the center square, a square larger in the amount of variation (amount of movement) of the distance measurement value.

The information processing apparatus 1 determines the orientation of the face based on the distance measurement values in the top part, bottom part, left part, and right part of the face. For example, the information processing apparatus 1 determines the orientation of the face in the vertical direction (up and down direction) based on a difference between the distance measurement value in the top part of the face and the distance measurement value in the bottom part of the face. Further, the information processing apparatus 1 determines the orientation of the face in the horizontal direction (left and right direction) based on a difference between the distance measurement value in the left part of the face and the distance measurement value in the right part of the face.

For example, when the difference between the distance measurement value in the top part of the face and the distance measurement value in the bottom part of the face is a predetermined threshold value or more, and the distance measurement value in the top part of the face is smaller than the distance measurement value in the bottom part of the face, the information processing apparatus 1 determines that the orientation of the face is downward. On the other hand, when the difference between the distance measurement value in the top part of the face and the distance measurement value in the bottom part of the face is the predetermined threshold value or more, and the distance measurement value in the bottom part of the face is smaller than the distance measurement value in the top part of the face, the information processing apparatus 1 determines that the orientation of the face is upward.

Further, when the difference between the distance measurement value in the left part of the face and the distance measurement value in the right part of the face is the predetermined threshold value or more, and the distance measurement value in the left part of the face is smaller than the distance measurement value in the right part of the face, the information processing apparatus 1 determines that the orientation of the face is rightward. On the other hand, when the difference between the distance measurement value in the left part of the face and the distance measurement value in the right part of the face is the predetermined threshold value or more, and the distance measurement value in the right part of the face is smaller than the distance measurement value in the left part of the face, the information processing apparatus 1 determines that the orientation of the face is leftward.

Further, when the difference between the distance measurement value in the top part of the face and the distance measurement value in the bottom part of the face is less than the predetermined threshold value, and the difference between the distance measurement value in the left part of the face and the distance measurement value in the right part of the face is less than the predetermined threshold value, the information processing apparatus 1 determines that the face is facing forward. Thus, the information processing apparatus 1 determines whether the orientation of the face is downward or upward, leftward or rightward, or forward based on the distance measurement values in the top part, bottom part, left part, and right part of the face to determine the face orientation.

Note that the information processing apparatus 1 may also determine the orientation of the face in the vertical direction (up and down direction) and the horizontal direction (left and right direction) depending on in which part the distance measurement value is the smallest among the top part, bottom part, left part, and right part of the face. Further, when the differences among the distance measurement values in the top part, bottom part, left part, and right part of the face are less than the predetermined threshold value, the information processing apparatus 1 may determine that the face is facing forward.

Figure 4:
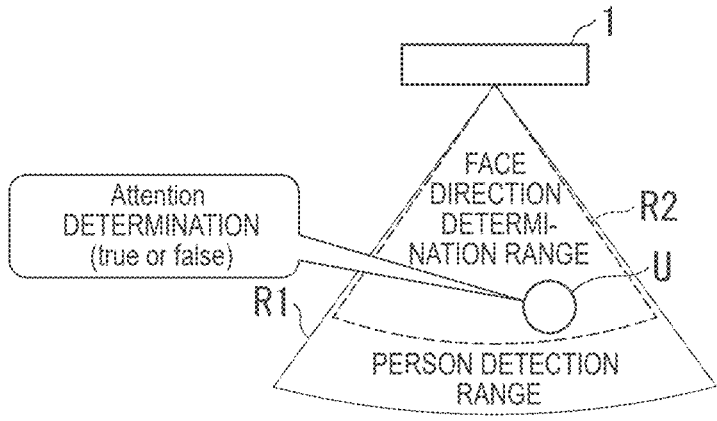
FIG. 4 is a schematic diagram illustrating a first example of person detection and face direction determination using a ToF sensor according to one or more embodiments.
Figure 5:
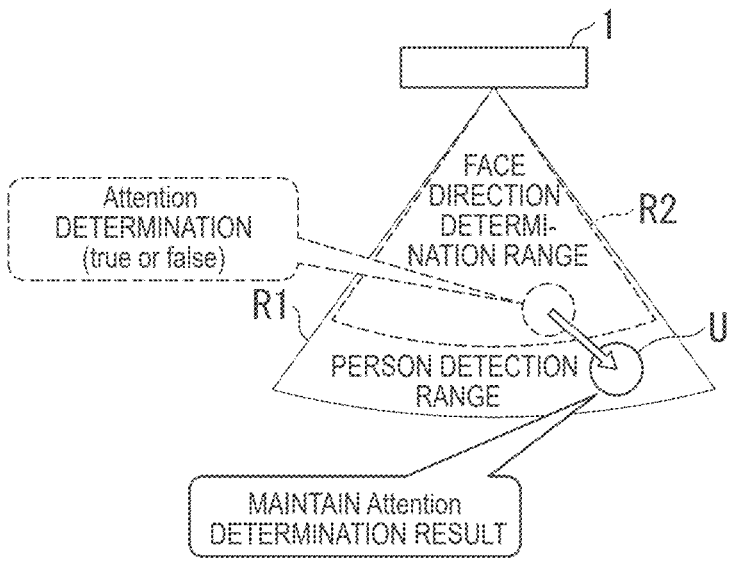
FIG. 5 is a schematic diagram illustrating a second example of person detection and face direction determination using the ToF sensor according to one or more embodiments.
Figure 6:
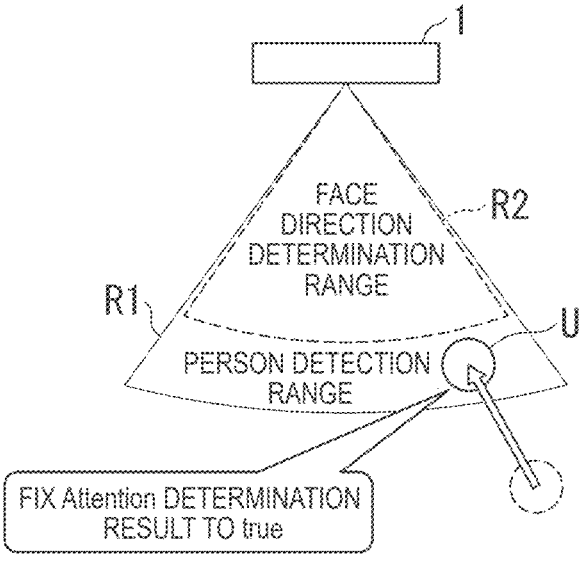
FIG. 6 is a schematic diagram illustrating a third example of person detection and face direction determination using the ToF sensor according to one or more embodiments.

Here, since the difference in distance measurement value among the top part, bottom part, left part, and right part of the face is not so big, a range capable of determining the orientation of the face is limited to a range closer in distance than a range capable of detecting the person. In other words, even when the information processing apparatus 1 detects the person using the ToF sensor 130 in the detection range FoV (for example, the range of about 2 m) illustrated in FIG. 2, a range capable of determining the orientation of the face of the detected person becomes comparatively closer in distance and narrower than the range capable of detecting the person (for example, becomes a range of about 1 m). Referring to FIG. 4 to FIG. 6, person detection and face direction determination using the ToF sensor 130 in one or more embodiments will be described.

FIG. 4 is a schematic diagram illustrating a first example of person detection and face direction determination using the ToF sensor 130 according to one or more embodiments. A range capable of detecting a person, which corresponds to the detection range FoV, is illustrated as a person detection range R1. Further, a range capable of determining a face orientation within the person detection range R1 is illustrated as a face direction determination range R2. The face direction determination range R2 is a range narrower than the person detection range R1 and closer in distance to the information processing apparatus 1 within the person detection range R1. A range outside of the face direction determination range R2 within the person detection range R1 is a range in which the ToF sensor 130 may not be able to determine the orientation of the face accurately even though it is possible to detect the person using the ToF sensor 130.

When person U is detected in the person detection range R1 and the detected person U is within the face direction determination range R2, the information processing apparatus 1 determines the orientation of a face of the person U using the ToF sensor 130. The information processing apparatus 1 determines whether or not the person U is paying attention to the information processing apparatus 1 based on the determination result of the orientation of the face of the person U. In the following, the determination of whether or not the person U is paying attention to the information processing apparatus 1 is called "Attention determination."

When determining that the face of the person U is facing forward, the information processing apparatus 1 determines that the person U is paying attention to the information processing apparatus 1, and sets "Attention=True" as the determination result of the Attention determination. On the other hand, when determining that the face of the person U is not facing forward, the information processing apparatus 1 determines that the person U is not paying attention to the information processing apparatus 1, and sets "Attention=False" as the determination result of the Attention determination.

FIG. 5 is a schematic diagram illustrating a second example of person detection and face direction determination using the ToF sensor 130 according to one or more embodiments. FIG. 5 illustrates Attention determination when the person U detected in the person detection range R1 moves from within the face direction determination range R2 (see FIG. 4) into a range out of the face direction determination range R2. When the person U detected in the person detection range R1 moves from within the face direction determination range R2 into the range out of the face direction determination range R2, the information processing apparatus 1 maintains the determination result of the orientation of the face determined within the face direction determination range R2, that is, maintains the determination result of the Attention determination.

For example, when the person U determined to be "Attention=True" within the face direction determination range R2 moves out of the face direction determination range R2, the information processing apparatus 1 maintains "Attention=True" as the determination result of the Attention determination. Further, when the person U determined to be "Attention=False" within the face direction determination range R2 moves out of the face direction determination range R2, the information processing apparatus 1 maintains "Attention=False" as the determination result of the Attention determination. Note that when the person U further moves and is no longer detected in the person detection range R1, the information processing apparatus 1 cancels the determination result of the Attention determination.

FIG. 6 is a schematic diagram illustrating a third example of person detection and face direction determination using the ToF sensor 130 according to one or more embodiments. FIG. 6 illustrates Attention determination when the person U moves from out of the person detection range R1 into the person detection range R1. When detecting the person U out of the face direction determination range R2 within the person detection range R1 due to the fact that the person U moves from out of the person detection range R1 into the person detection range R1 (the person U approaches the information processing apparatus 1), the information processing apparatus 1 fixes the determination result of the Attention determination to "Attention=True." Note that, when the person U further moves (further approaches the information processing apparatus 1) and the person U falls within the face direction determination range R2, the information processing apparatus 1 determines the orientation of the face of the person U using the ToF sensor 130 as illustrated in FIG. 4.

Hardware Configuration of Information Processing Apparatus

Figure 7:
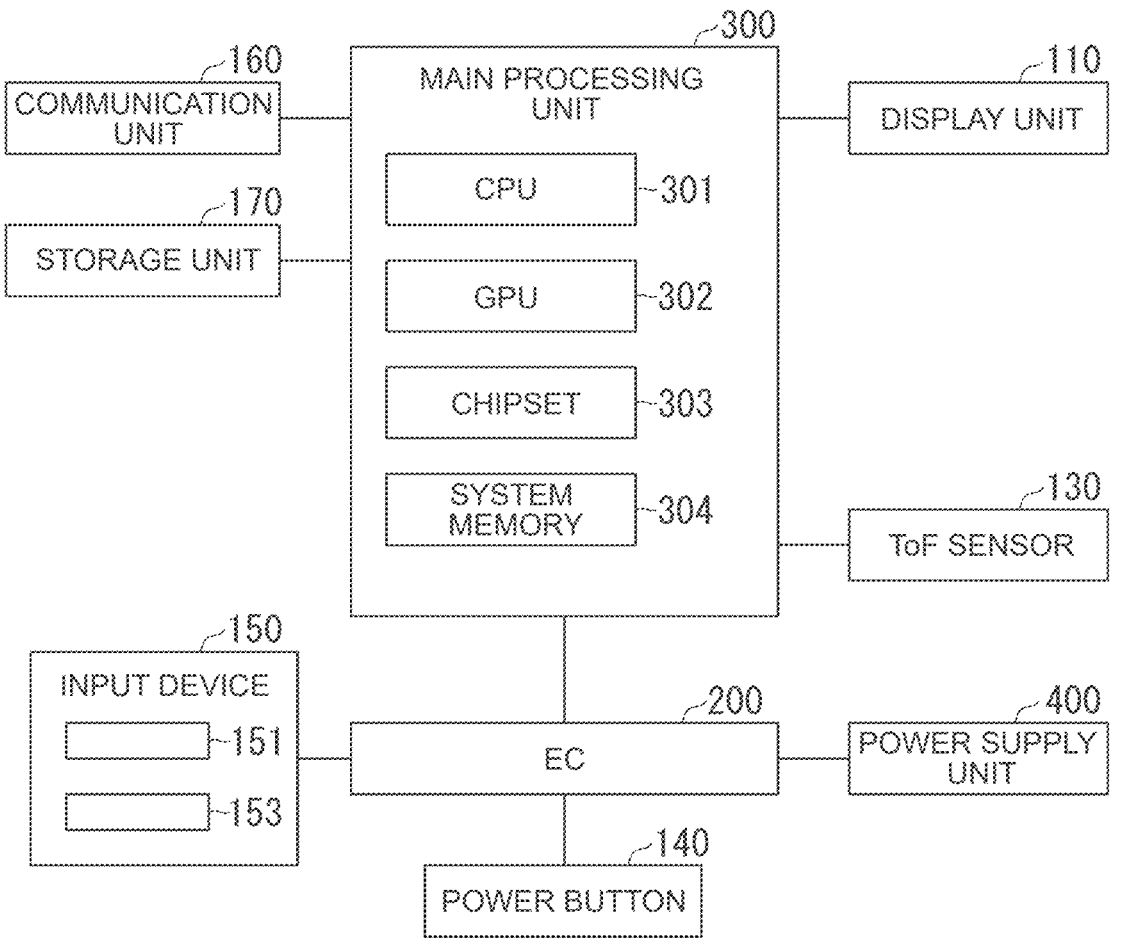
FIG. 7 is a schematic block diagram illustrating an example of the hardware configuration of the information processing apparatus according to one or more embodiments.

FIG. 7 is a schematic block diagram illustrating an example of the hardware configuration of the information processing apparatus 1 according to one or more embodiments. In FIG. 7, components corresponding to respective units in FIG. 1 are given the same reference numerals. The information processing apparatus 1 is configured to include the display unit 110, the ToF sensor 130, the power button 140, an input device 150, a communication unit 160, a storage unit 170, an EC (Embedded Controller) 200, a main processing unit 300, and a power supply unit 400.

The display unit 110 displays display data (images) generated based on system processing executed by the main processing unit 300, processing of application programs running on the system processing, and the like.

As described above, the ToF sensor 130 is a distance measuring sensor using a ToF method to measure the distance to an object (for example, a person) present in front. For example, the ToF sensor 130 outputs a distance measurement signal containing a distance measurement value obtained by measuring the distance to the object (for example, the person) present within the detection range FOV in the direction (frontward) facing the inner surface of the first chassis 10.

The power button 140 outputs, to the EC 200, an operation signal according to a user operation. The input device 150 is an input unit for accepting user input, which is configured to include, for example, the keyboard 151 and the touch pad 153. In response to accepting operations on the keyboard 151 and the touch pad 153, the input device 150 outputs, to the EC 200, operation signals indicative of the operation details.

The communication unit 160 is connected to other devices communicably through a wireless or wired communication network to transmit and receive various data. For example, the communication unit 160 is configured to include a wired LAN interface such as Ethernet (registered trademark), a wireless LAN interface such as Wi-Fi (registered trademark), and the like.

The storage unit 170 is configured to include storage media, such as an HDD (Hard Disk Drive) or an SSD (Solid State Drive), a RAM, a ROM, and the like. The storage unit 170 stores the OS, device drivers, various programs such as applications, and various data acquired by the operation of the programs.

The power supply unit 400 supplies power to each unit according to the operating state of each unit of the information processing apparatus 1. The power supply unit 400 includes a DC (Direct Current)/DC converter. The DC/DC converter converts the voltage of DC power, supplied from an AC (Alternate Current)/DC adapter or a battery (battery pack), to a voltage required for each unit. The power with the voltage converted by the DC/DC converter is supplied to each unit through each power system. For example, the power supply unit 400 supplies power to each unit through each power system based on a control signal input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the own ROM, and executes the read control program to fulfill the functionality. The EC 200 operates independently of the main system processing unit 300 to control the operation of the main processing unit 300 and manage the operating state of the main processing unit 300. Further, the EC 200 is connected to the power button 140, the input device 150, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the information processing apparatus 1. Further, the EC 200 acquires operation signals from the power button 140 and the input device 150, and outputs, to the main processing unit 300, an operation signal related to processing of the main processing unit 300 among the acquired operation signals.

The main processing unit 300 is configured to include a CPU (Central Processing Unit) 301, a GPU (Graphic Processing Unit) 302, a chipset 303, and a system memory 304, where processing of various application programs is executable on the OS (Operating System) by system processing based on the OS.

The CPU 301 is a processor to execute processing based on a BIOS program, processing based on the OS program, processing based on application programs running on the OS, and the like. For example, the CPU 301 executes boot processing to boot the system from the standby state and make the transition to the normal operating state, sleep processing to make the transition from the normal operating state to the standby state, and the like. Further, the CPU 301 executes screen brightness control processing to control the screen brightness of the display unit 110 based on the determination result of the orientation of the face described above.

The GPU 302 is connected to the display unit 110. The GPU 302 executes image processing under the control of the CPU 301 to generate display data. The GPU 302 outputs the generated display data to the display unit 110.

The chipset 303 has a function as a memory controller, a function as an I/O controller, and the like. For example, the chipset 303 controls reading data from and writing data to the system memory 304, the storage unit 170, and the like by the CPU 301 and the GPU 302. Further, the chipset 303 controls input/output of data from the communication unit 160, the display unit 110, and the EC 200. Further, the chipset 303 has a function as a sensor hub. For example, the chipset 303 acquires distance measurement signals output from the ToF sensor 130, and the like.

The system memory 304 is used as a reading area of a program executed by the CPU 301 and a working area to write processed data.

Note that the CPU 301, the GPU 302, and the chipset 303 may also be integrated as one processor, or some or each of them may be configured as an individual processor, respectively. For example, in the normal operating state, the CPU 301, the GPU 302, and the chipset 303 are all operating, but in the standby state, only at least some of the functions of the chipset 303 are operating.

Functional Configuration of Information Processing Apparatus

Next, the functional configuration of the information processing apparatus 1 to detect a person and determine the orientation of a face using the ToF sensor 130 will be described in detail.

Figure 8:
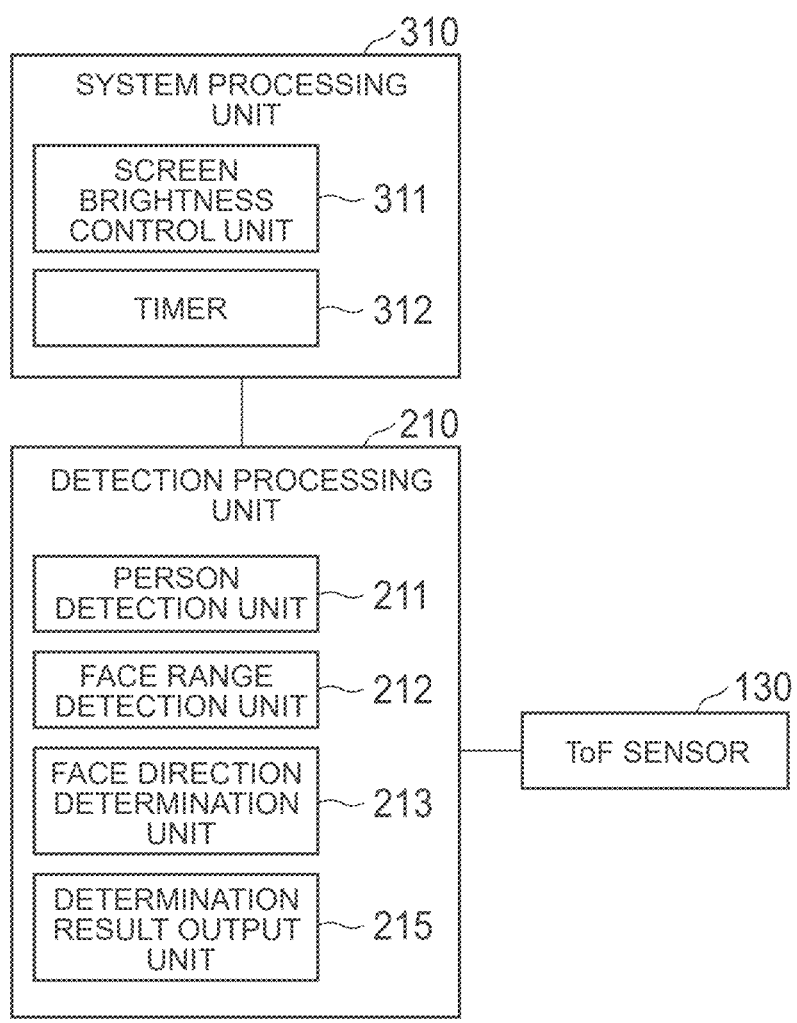
FIG. 8 is a schematic block diagram illustrating an example of the functional configuration of the information processing apparatus according to one or more embodiments.

FIG. 8 is a schematic block diagram illustrating an example of the functional configuration of the information processing apparatus 1 according to one or more embodiments. The information processing apparatus 1 includes a detection processing unit 210 that acquires distance measurement signals measured by the ToF sensor 130 to detect a person and determine the orientation of a face, and a system processing unit 310 that performs processing based on the detection result and the determination result by the detection processing unit 210. The detection processing unit 210 includes a person detection unit 211, a face range detection unit 212, a face direction determination unit 213, and a determination result output unit 215 as functional components for detecting a person and determining the orientation of a face described above by the CPU 301 or the chipset 303 executing a specific program(s).

The person detection unit 211 performs person detection processing to detect a person present within the person detection range R1 (within the detection range FoV) based on the distance measurement values of the ToF sensor 130. For example, since any person moves to some extent unlike an object, the person detection unit 211 may exclude, from a detection target, an object that is completely stationary when detecting a person, and target only a moving (for example, slightly moving) object as the detection target.

When a person is detected by the person detection unit 211, the face range detection unit 212 performs face range detection processing to detect a range of a face of the person. For example, the face range detection unit 212 first detects a range of the person, and then detects a face range from within the range of the person.

Specifically, for example, as described with reference to FIG. 3, the face range detection unit 212 acquires a distance measurement value for each square (each measurement unit), obtained by dividing the detection range FoV into 64-square measurement units of 8×8 squares, by the distance measurement signal output from the ToF sensor 130. Then, when the edge in a range of squares, in which distance measurement values are obtained with small differences thereamong (for example, about 450 to 610) within 1 m (1000 mm) becomes a mountain shape having the characteristics of a person, the face range detection unit 212 detects the range as a range of the person.

Further, like the detection of the person by the person detection unit 211 mentioned above, when detecting a range of the person, the face range detection unit 212 may exclude, from a detection target, an object that is completely stationary, and target only a moving (for example, slightly moving) object as the detection target. For example, the face range detection unit 212 determines whether or not distance measurement values are the distance measurement values of the moving object based on the amount of change in distance measurement value of each square from each distance measurement value measured in each predetermined cycle (for example, at one second interval), and detects the range of the person based on the edge in a range of squares in which the distance measurement values of the moving object are obtained.

Next, the face range detection unit 212 detects a face range of the person based on the edge shape in the detected range of the person. For example, the face range detection unit 212 detects a shoulder range within the range of the person and detects, as a face range, 3 (horizontal)×4 (vertical) squares, 3 (horizontal)×3 (vertical) squares, or the like above the shoulder range (see FIG. 3).

The face direction determination unit 213 performs face direction determination processing to determine the face orientation based on distance measurement values within the face range detected by the face range detection unit 212. For example, the face direction determination unit 213 determines the face orientation based on differences among distance measurement values for multiple squares (measurement units) within the face range. Specifically, as described with reference to FIG. 3, the face direction determination unit 213 determines the face orientation by determining an orientation of the face in the vertical direction (up and down direction), an orientation of the face in the horizontal direction (left and right direction), or whether or not the orientation of the face is front facing based on differences among the distance measurement values in the top part, bottom part, left part, and right part of the face. For example, the face direction determination unit 213 determines the face orientation depending on which part in the face range is closest based on the distance measurement values for multiple squares (measurement units) within the face range.

Note that the face direction determination unit 213 may also calculate an average distance to the person based on the distance measurement values within the range of the person to detect the face orientation by taking into account the calculated average distance to the person. For example, the face direction determination unit 213 may also perform the detection using the average distance to the person when calculating the differences among the distance measurement values for multiple squares (measurement units) within the face range.

Here, when the person detected by the person detection unit 211 is within the face direction determination range R2, the face direction determination unit 213 determines the face orientation based on the distance measurement values by the ToF sensor 130 as described above (see FIG. 4). On the other hand, when the person detected by the person detection unit 211 is out of the face direction determination range R2, since there is a possibility not to be able to determine the face orientation accurately due to an error in distance measurement value, the face direction determination unit 213 does not make the determination of the face orientation based on the distance measurement values.

For example, when the person detected by the person detection unit 211 moves from within the face direction determination range R2 into a range out of the face direction determination range R2, the face direction determination unit 213 maintains the determination result of the face orientation determined within the face direction determination range R2 (see FIG. 5). Further, when a person is detected out of the face direction determination range R2 within the person detection range R1 from a state where no person is detected within the person detection range R1 by the person detection unit 211, the face direction determination unit 213 fixes the determination result of the face orientation to a preset face orientation (see FIG. 6). For example, the preset face orientation indicates a state where the face is facing forward.

Further, after maintaining the determination result of the face orientation determined within the face direction determination range R2 due to the fact that the person detected by the person detection unit 211 moves from within the face direction determination range R2 into a range out of the face direction determination range R2, when the person detected by the person detection unit 211 moves into the face direction determination range R2 again, the face direction determination unit 213 cancels the maintenance of the determination result, and determines a face orientation of the person using the ToF sensor 130 (see FIG. 4).

Further, after maintaining the determination result of the face orientation determined within the face direction determination range R2 due to the fact that the person detected by the person detection unit 211 moves from within the face direction determination range R2 into the range out of the face direction determination range R2, when the person is no longer detected within the person detection range R1 by the person detection unit 211, the face direction determination unit 213 cancels the maintenance of the determination result, and ends the face direction determination processing.

Further, after fixing the determination result of the face orientation due to the fact that a person is detected out of the face direction determination range R2 within the person detection range R1 from a state where no person is detected within the person detection range R1 by the person detection unit 211, when the person detected by the person detection unit 211 moves from out of the face direction determination range R2 into the face direction determination range R2, the face direction determination unit 213 cancels the fixation of the determination result, and determines a face orientation of the person using the ToF sensor 130.

Further, after fixing the determination result of the face orientation due to the fact that person is detected out of the face direction determination range R2 within the person detection range R1 from the state where no person is detected within the person detection range R1 by the person detection unit 211, when the person is no longer detected within the person detection range R1 by the person detection unit 211, the face direction determination unit 213 cancels the fixation of the determination result, and ends the face direction determination processing.

The determination result output unit 215 outputs, to the system processing unit 310, information based on the face orientation detected by the face direction determination unit 213. For example, when determining that the orientation of the face detected by the face direction determination unit 213 is front facing, since the person is paying attention to the information processing apparatus 1, the determination result output unit 215 outputs "Attention=True" as the determination result of the Attention determination. On the other hand, when determining that the orientation of the face detected by the face direction determination unit 213 is not front facing, since the person is not paying attention to the information processing apparatus 1, the determination result output unit 215 outputs "Attention=False" as the determination result of the Attention determination.

Note that the determination result output unit 215 may also output information indicative of the face orientation as information based on the face orientation detected by the face direction determination unit 213. The information indicative of the face orientation is an orientation of the face facing forward, facing upward, facing downward, facing leftward, facing rightward, or the like.

The system processing unit 310 is a functional component implemented by the CPU 301 executing BIOS and OS programs. For example, the system processing unit 310 includes a screen brightness control unit 311 and a timer 312 as functional components implemented by executing the OS program.

The screen brightness control unit 311 controls the screen brightness of the display unit 110 based on the face orientation detected by the face detection unit 210. For example, when acquiring "Attention=False" from the detection processing unit 210 in the normal operating state, the screen brightness control unit 311 controls the screen brightness to the low brightness.

Further, when acquiring "Attention=True" from the detection processing unit 210 in a state where the screen brightness is controlled to the low brightness, the screen brightness control unit 311 restores the screen brightness to the standard brightness. In other words, when it is detected by the detection processing unit 210 that the face orientation is front facing in the state where the screen brightness is reduced, the screen brightness control unit 311 restores the screen brightness to the standard brightness before being reduced.

The timer 312 is a timer for measuring a waiting time after the acquisition of "Attention=False" from the face detection unit 210 until the control of the screen brightness to the low brightness in the normal operating state. When acquiring "Attention=True" before a predetermined waiting time elapses even after acquiring "Attention=False," the screen brightness control unit 311 maintains the standard brightness without controlling the screen brightness to the low brightness. After "Attention=False" is acquired, when "Attention=True" is not acquired during the predetermined waiting time, the screen brightness control unit 311 controls the screen brightness to the low brightness. Thus, the screen brightness can be prevented from being controlled to the low brightness when the user looks away a little while using the information processing apparatus 1. The predetermined waiting time is preset, for example, to ten seconds or the like. Note that this predetermined waiting time may also be settable by the user.

Operation of Face Direction Determination Processing

Figure 9:
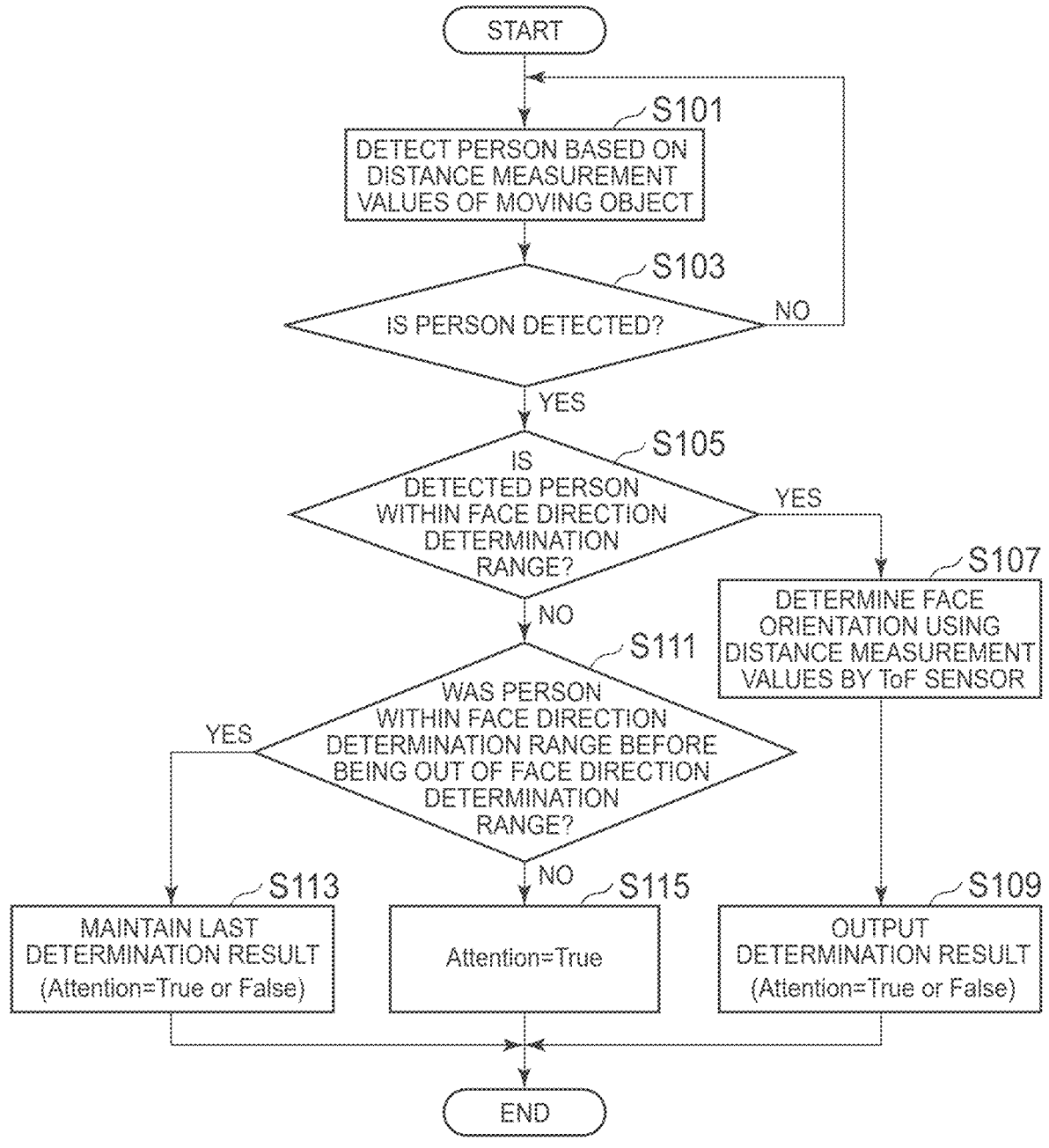
FIG. 9 is a flowchart illustrating an example of face direction determination processing according to one or more embodiments.

Referring next to FIG. 9, the operation of face direction determination processing in which the information processing apparatus 1 detects the face orientation using the ToF sensor 130 will be described.

FIG. 9 is a flowchart illustrating an example of face direction determination processing according to one or more embodiments.

(Step S101) The detection processing unit 210 performs person detection processing to acquire distance measurement signals output from the ToF sensor 130 in predetermined cycles in order to detect a person present within the person detection range R1 based on the distance measurement values of the ToF sensor 130. For example, the detection processing unit 210 detects a person present within the person detection range R1 based on the distance measurement values of a moving (for example, slightly moving) object. Then, the detection processing unit 210 proceeds to a process in step 103.

(Step S103) The detection processing unit 210 determines whether or not a person is detected in the person detection processing of step S101. When determining that any person is not detected (NO), the detection processing unit 210 continues the process in step S101 to continuously perform the person detection processing. On the other hand, when determining that a person is detected (YES), the detection processing unit 210 proceeds to a process in step S105.

(Step S105) The detection processing unit 210 determines whether or not the person detected in the person detection processing of step S101 is within the face direction determination range R2. When determining that the detected person is within the face direction determination range R2 (YES), the detection processing unit 210 proceeds to a process in step S107. On the other hand, when determining that the detected person is out of the face direction determination range R2 (NO), the detection processing unit 210 proceeds to a process in step S111.

(Step S107) The detection processing unit 210 determines the face orientation using the distance measurement values by the ToF sensor 130. For example, as described with reference to FIG. 3, the detection processing unit 210 detects a face range of the person based on the edge shape in the detected range of the person to determine the face orientation based on the distance measurement values within the face range. Then, the detection processing unit 210 proceeds to a process in step S109.

(Step S109) The detection processing unit 210 outputs, to the system processing unit 310, information based on the face orientation determined in step S107 as the determination result. For example, the detection processing unit 210 outputs, to the system processing unit 310, the determination result of the Attention determination based on the face orientation determined in step S107. As an example, when the detected face orientation is front facing, the detection processing unit 210 outputs "Attention=True" to the system processing unit 310. On the other hand, when the detected face orientation is not front facing, the detection processing unit 210 outputs "Attention=False" to the system processing unit 310.

(Step S111) When the person detected in the person detection processing of step S101 is out of the face direction determination range R2, the detection processing unit 210 determines whether or not the person was within the face direction determination range R2 before being out of the face direction determination range R2. When determining that the person was within the face direction determination range R2 before being out of the face direction determination range R2 (YES), the detection processing unit 210 proceeds to a process in step S113. On the other hand, when determining that the person was not within the face direction determination range R2 before being out of the face direction determination range R2 (NO), the detection processing unit 210 proceeds to a process in step S115.

(Step S113) The detection processing unit 210 maintains the last determination result because the person detected in the person detection range R1 moves from within the face direction determination range R2 into a range out of the face direction determination range R2. For example, when the person determined as "Attention=True" within the face direction determination range R2 moves out of the face direction determination range R2, the detection processing unit 210 maintains the determination result and outputs "Attention=True" to the system processing unit 310. Further, when the person determined as "Attention=False" within the face direction determination range R2 moves out of the face direction determination range R2, the detection processing unit 210 maintains the determination result and outputs "Attention=False" to the system processing unit 310.

(Step S115) When the person was not within the face direction determination range R2 before being out of the face direction determination range R2, that is, when the person was out of the person detection range R1 before being out of the face direction determination range R2, the detection processing unit 210 fixes "Attention=True" as the determination result and outputs "Attention=True" to the system processing unit 310.

Operation of Screen Brightness Control Processing

Figure 10:
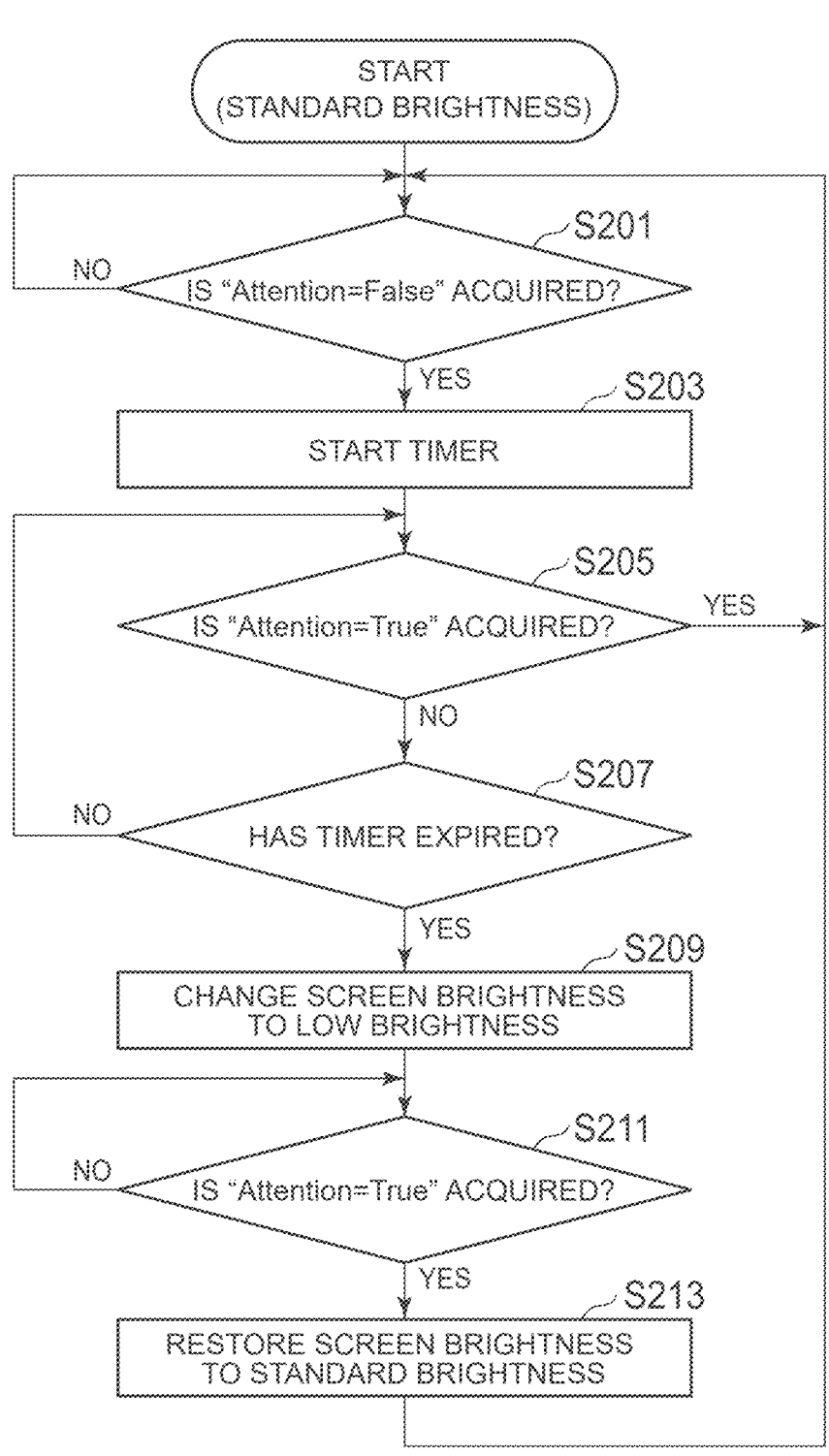
FIG. 10 is a flowchart illustrating an example of screen brightness control processing according to one or more embodiments.

Referring next to FIG. 10, the operation of screen brightness control processing executed by the system processing unit 310 will be described. FIG. 10 is a flowchart illustrating an example of screen brightness control processing according to one or more embodiments. Here, it is assumed that the information processing apparatus 1 is in the normal operating state, the face of a person (user) is facing forward, and the screen brightness is set to the standard brightness.

(Step S201) The screen brightness control unit 311 determines whether or not "Attention=False" is acquired from the detection processing unit 210. When determining that "Attention=False" is not acquired (NO), the screen brightness control unit 311 performs the process in step S201 again. On the other hand, when determining that "Attention=False" is acquired (YES), the screen brightness control unit 311 starts measuring the waiting time using the timer 312 (step S203). Then, the screen brightness control unit 311 proceeds to a process in step S205.

(Step S205) The screen brightness control unit 311 determines whether or not "Attention=True" is acquired from the detection processing unit 210. When determining that "Attention=True" is not acquired (NO), the screen brightness control unit 311 proceeds to a process in step S207.

(Step S207) The screen brightness control unit 311 determines whether or not the predetermined waiting time (for example, ten seconds) has passed based on the value of the timer 312 (that is, whether or not the timer has expired). When determining that the predetermined waiting time (for example, 10 seconds) has not passed yet (that is, the timer has not expired yet) (step S207: NO), the screen brightness control unit 311 returns to the process in step S205. When determining that "Attention=True" is acquired before the predetermined waiting time (for example, 10 seconds) passes (step S205: YES), the screen brightness control unit 311 returns to the process in step S201. At this time, the timer 312 is reset.

On the other hand, when determining that the predetermined waiting time (for example, 10 seconds) has passed in step S207 (step S207: YES), the screen brightness control unit 311 changes the screen brightness to the low brightness (step S209). Then, the screen brightness control unit 311 proceeds to a process in step S211.

(Step S211) The screen brightness control unit 311 determines whether or not "Attention=True" is acquired from the detection processing unit 210. When determining that "Attention=True" is not acquired (NO), the screen brightness control unit 311 performs the process in step S211 again. On the other hand, when determining that "Attention=True" is acquired (YES), the screen brightness control unit 311 restores the screen brightness to the standard brightness (step S213).

SUMMARY OF EMBODIMENTS

As described above, the information processing apparatus 1 according to one or more embodiments includes: the ToF sensor 130 (an example of a distance measuring sensor) which measures the distance to an object; the system memory 304 (an example of a memory) which temporarily stores distance measurement values (an example of distance information) indicative of the distance measured by the ToF sensor 130; and a processor (for example, the CPU 301, the chipset 303, or the like) which executes processing (for example, person detection processing, face direction determination processing, and the like) based on the distance measurement values. In the person detection processing, the information processing apparatus 1 detects a person present within a first distance range (for example, the person detection range R1) using the ToF sensor 130. Further, in the face direction determination processing, when a person is detected within the person detection range R1 by the person detection processing mentioned above, the information processing apparatus 1 determines a face orientation of the person concerned. For example, in the face direction determination processing, when the person detected by the person detection processing is within a second distance range (for example, the face direction determination range R2) closer than the first distance range, the information processing apparatus 1 determines a face orientation of the person using the ToF sensor 130. Further, in the face direction determination processing, when the person detected by the person detection processing mentioned above moves from within the face direction determination range R2 into a range out of the face direction determination range R2, the information processing apparatus 1 maintains the determination result of the face orientation determined within the face direction determination range R2. Further, in the face direction determination processing, when a person is detected in the range out of the face direction determination range R2 within the person detection range R1 from a state where no person is detected within the person detection range R1 by the person detection processing, the information processing apparatus 1 fixes the determination result to a preset face orientation (for example, front facing toward the information processing apparatus 1).

Thus, the information processing apparatus 1 can improve control stability using the ToF sensor 130 because the determination result does not change unstably near the boundary of a distance range in which the face orientation can be determined.

Further, in the face direction determination processing, after maintaining the determination result of the face orientation determined within the face direction determination range R2 due to the fact that the person detected by the person detection processing moves from within the face direction determination range R2 into the range out of the face direction determination range R2, when the person detected by the person detection processing moves into the face direction determination range R2 again, the information processing apparatus 1 cancels the maintenance of the determination result and determines a face orientation of the person using the ToF sensor 130.

Thus, even when the determination result of the face orientation is not updated due to the fact that the person moves into the range out of the face direction determination range R2, the information processing apparatus 1 can resume the determination of the face orientation just by the person getting closer to within the face direction determination range R2.

Further, in the face direction determination processing, after maintaining the determination result of the face orientation determined within the face direction determination range R2 due to the fact that the person detected by the person detection processing moves from within the face direction determination range R2 into the range out of the face direction determination range R2, when the person is no longer detected within the person detection range R1 by the person detection processing, the information processing apparatus 1 cancels the maintenance of the determination result and ends the face direction determination processing.

Thus, when the person leaves and becomes absent, the information processing apparatus 1 can end the face direction determination processing because there is no need to determine a face orientation.

Further, in the face direction determination processing, after fixing the determination result of the face orientation due to the fact that the person is detected in the range out of the face direction determination range R2 within the person detection range R1 from the state where no person is detected within the person detection range R1 by the person detection processing, when the person detected by the person detection processing moves into the face direction determination range R2 from the range out of the face direction determination range R2, the information processing apparatus 1 cancels the fixation of the determination result and determines a face orientation of the person using the ToF sensor 130.

Thus, when the person approaches, the information processing apparatus 1 can detect the person as a person using the information processing apparatus 1 even at a distance where the determination of the face orientation cannot be made.

Further, in the face direction determination processing, after fixing the determination result of the face orientation due to the fact that the person is detected in the range out of the face direction determination range R2 within the person detection range R1 from the state where no person is detected within the person detection range R1 by the person detection processing, when the person is no longer detected within the person detection range R1 by the person detection processing, the information processing apparatus 1 cancels the fixation of the determination result and ends the face direction determination processing.

Thus, when the person leaves and becomes absent, the information processing apparatus 1 can end the face direction determination processing because there is no need to determine a face orientation.

Further, in the face direction determination processing, the information processing apparatus 1 determines whether or not the face orientation of the person detected within the person detection range R1 by the person detection processing is facing a direction of the information processing apparatus 1, and when fixing the determination result to the preset face orientation, the information processing apparatus 1 fixes the determination result to a result of determining that the face orientation of the person is facing the direction of the information processing apparatus 1 (for example, "Attention=True").

Thus, when the person approaches, the information processing apparatus 1 can detect the person as a person using the information processing apparatus 1 even at a distance where the determination of the face orientation cannot be made.

Further, the information processing apparatus 1 performs screen brightness control processing to control the screen brightness of the display unit 110 based on the face orientation determined by the face direction determination processing.

Thus, for example, when the face is not facing forward, since the information processing apparatus 1 can reduce or turn off the screen brightness, the information processing apparatus 1 can prevent power from being wastefully consumed during a period when the information processing apparatus 1 is not used.

Further, a control method for the information processing apparatus 1 according to one or more embodiments includes: a person detection step of causing a processor (for example, the CPU 301, the chipset 303, or the like) to detect a person present within a first distance range (for example, the person detection range R1) using the ToF sensor 130; and a face direction determination step of causing the processor to determine a face orientation of the person when the person is detected within the person detection range R1 by the person detection step, wherein in the face direction determination step, when the person detected by the person detection step is within a second distance range (for example, the face direction determination range R2) closer than the first distance range mentioned above, the processor determines a face orientation of the person using the ToF sensor 130, when the person detected by the person detection step moves from within the face direction determination range R2 into a range out of the face direction determination range R2, the processor maintains the determination result of the face orientation determined within the face direction determination range R2, and when a person is detected in the range out of the face direction determination range R2 within the person detection range R1 from a state where no person is detected within the person detection range R1 by the person detection step, the processor fixes the determination result to a preset face orientation (for example, front facing toward the information processing apparatus 1).

Thus, the control method for the information processing apparatus 1 can improve control stability using the ToF sensor 130 because the determination result does not change unstably near the boundary of a distance range in which the face orientation can be determined.

While the embodiments of this invention have been described in detail above with reference to the accompanying drawings, the specific configurations are not limited to those described above, and design changes and the like are included without departing from the scope of this invention. For example, the respective components described in the embodiments mentioned above can be combined arbitrarily.

Further, in the aforementioned embodiments, the information processing apparatus 1 detects the face orientation using distance measurement values in four squares of the top part, bottom part, left part, and right part of the face within the range of the detected face, but the information processing apparatus 1 may detect a face orientation (upward facing, downward facing, or front facing) using distance measurement values in two squares of the top part and bottom part of the face, or may detect a face orientation (leftward facing, rightward facing, or front facing) using distance measurement values in two squares of the left part and right part of the face.

Further, the information processing apparatus 1 may detect a face orientation using distance measurement values in five or more squares within the range of the detected face (for example, within the range of 3×4 squares or 3×3 squares). For example, the information processing apparatus 1 may detect a face orientation using distance measurement values in five squares of the central part, top part, bottom part, left part, and right part of the face within the range of the detected face. Further, the information processing apparatus 1 may detect a face orientation using distance measurement values in eight squares around the center of the face within the range of the detected face, or may detect a face orientation using distance measurement values in nine squares with the distance measurement value of the center of the face further added.

Further, in the aforementioned embodiments, the configuration example in which the ToF sensor 130 is built in the information processing apparatus 1, but the present invention is not limited to this example. For example, the ToF sensor 130 does not have to be built in the information processing apparatus 1, which may also be attachable to the information processing apparatus 1 (for example, onto any one of the side faces 10a, 10b, 10c, and the like) and communicably connected to the information processing apparatus 1 wirelessly or by wire as an external accessory of the information processing apparatus 1.

Further, in the aforementioned embodiments, the ToF sensor 130 using infrared light is described as an example of the distance measuring sensor, but the present invention is not limited to this example. For example, a distance measuring sensor using laser or ultrasound may also be used.

Further, a hibernation state, a power-off state, and the like may be included as the standby state described above. The hibernation state corresponds, for example, to S4 state defined in the ACPI specification. The power-off state corresponds, for example, to S5 state (shutdown state) defined in the ACPI specification. Note that the standby state, the sleep state, the hibernation state, the power-off state, and the like as the standby state are states lower in power consumption than the normal operating state (states of reducing power consumption).

Note that the information processing apparatus 1 described above has a computer system therein. Then, a program for implementing the function of each component included in the information processing apparatus 1 described above may be recorded on a computer-readable recording medium so that the program recorded on this recording medium is read into the computer system and executed to perform processing in each component included in the information processing apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a portable medium such as a flexible disk, a magneto-optical disk, a flash ROM, or a CD-ROM, or a storage device such as a hard disk built in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be split into plural pieces, downloaded at different timings, respectively, and then united in each component included in the information processing apparatus 1, or delivery servers for delivering respective split pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called a differential file (differential program) capable of implementing the above-described functions in combination with a program(s) already recorded in the computer system.

Further, some or all of the functions of the information processing apparatus 1 in the embodiments described above may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the information processing apparatus 1 of the aforementioned embodiments is not limited to the laptop PC, which may also be a desktop PC, a tablet terminal device, a smartphone, a gaming device, a multimedia terminal, or the like, for example.

DESCRIPTION OF SYMBOLS

1 information processing apparatus
10 first chassis
20 second chassis
15 hinge mechanism
110 display unit
130 ToF sensor
140 power button
150 input device
151 keyboard
153 touch pad
160 communication unit
170 storage unit
200 EC
210 detection processing unit

211 person detection unit
212 face range detection unit
213 face direction determination unit
215 determination result output unit
300 main processing unit
301 CPU
302 GPU
303 chipset
304 system memory
310 system processing unit
311 screen brightness control unit
312 timer
400 power supply unit

What is claimed is:

1. An information processing apparatus comprising:
a time-of-flight (ToF) sensor which measures a distance to an object;
a memory which temporarily stores distance information indicative of the distance measured by the ToF sensor; and
a processor which executes processing based on the distance information, the processor performing
person detection processing to detect a person present within a first distance range using the ToF sensor, and
face direction determination processing to determine a face orientation of the person when the person is detected within the first distance range by the person detection processing, wherein
in the face direction determination processing, when the person detected by the person detection processing is within a second distance range closer than the first distance range, the processor determines a face orientation of the person using the ToF sensor,
when the person detected by the person detection processing moves from within the second distance range into a range out of the second distance range but inside the first distance range, the processor maintains the determination result of the face orientation determined within the second distance range, and
when a person is detected within the first distance range but outside the second distance range from a state where no person is detected within the first distance range by the person detection processing, the processor fixes the determination result to a preset face orientation.

2. The information processing apparatus according to claim 1, wherein
in the face direction determination processing, after maintaining the determination result of the face orientation determined within the second distance range due to the fact that the person detected by the person detection processing moves from within the second distance range into the range out of the second distance range, when the person detected by the person detection processing moves into the second distance range again, the processor cancels the maintenance of the determination result and determines a face orientation of the person using the ToF sensor.

3. The information processing apparatus according to claim 1, wherein
in the face direction determination processing, after maintaining the determination result of the face orientation determined within the second distance range due to the fact that the person detected by the person detection processing moves from within the second distance range into the range out of the second distance range, when the person is no longer detected within the first distance range by the person detection processing, the processor cancels the maintenance of the determination result and ends the face direction determination processing.

4. The information processing apparatus according to claim 1, wherein in the face direction determination processing, after fixing the determination result of the face orientation due to the fact that the person is detected in the range out of the second distance range within the first distance range from the state where no person is detected within the first distance range by the person detection processing, when the person detected by the person detection processing moves into the second distance range from the range out of the second distance range, the processor cancels the fixation of the determination result and determines a face orientation of the person using the ToF sensor.

5. The information processing apparatus according to claim 1, wherein in the face direction determination processing, after fixing the determination result of the face orientation due to the fact that the person is detected in the range out of the second distance range within the first distance range from the state where no person is detected within the first distance range by the person detection processing, when the person is no longer detected within the first distance range by the person detection processing, the processor cancels the fixation of the determination result and ends the face direction determination processing.

6. The information processing apparatus according to claim 1, wherein in the face direction determination processing, the processor determines whether or not the face orientation of the person detected within the first distance range by the person detection processing is facing a direction of the information processing apparatus, and when fixing the determination result to the preset face orientation, the processor fixes the determination result to such a determination result that the face orientation of the person is facing the direction of the information processing apparatus.

7. The information processing apparatus according to claim 1, wherein the processor performs screen brightness control processing to control screen brightness of a display unit based on the face orientation determined by the face direction determination processing.

8. A control method for an information processing apparatus including: a time-of-flight (ToF) sensor which measures a distance to an object; a memory which temporarily stores distance information indicative of the distance measured by the ToF sensor; and a processor which executes processing based on the distance information, the control method comprising:

a person detection step of causing the processor to detect a person present within a first distance range using the ToF sensor; and a face direction determination step of causing the processor to determine a face orientation of the person when the person is detected within the first distance range by the person detection step, wherein in the face direction determination step, when the person detected by the person detection step is within a second distance range closer than the first distance range, the processor determines a face orientation of the person using the ToF sensor, when the person detected by the person detection step moves from within the second distance range into a range out of the second distance range but inside the first distance range, the processor maintains the determination result of the face orientation determined within the second distance range, and when a person is detected within the first distance range but outside the second distance range from a state where no person is detected within the first distance range by the person detection step, the processor fixes the determination result to a preset face orientation.

* * * * *